United States Patent
Seljan et al.

(10) Patent No.: US 11,430,012 B2
(45) Date of Patent: Aug. 30, 2022

(54) METHOD AND APPARATUS FOR GENERATING PERSONALIZED PAYLOADS

(71) Applicants: AT&T Intellectual Property I, L.P., Atlanta, GA (US); Xandr Inc., New York, NY (US)

(72) Inventors: Samuel Seljan, Portland, OR (US); Ashutosh Sanzgiri, Portland, OR (US); David Crawford Gibbon, Lincroft, NJ (US); Lee Begeja, Gillette, NJ (US); Eric Zavesky, Austin, TX (US)

(73) Assignees: AT&T Intellectual Property I, L.P., Atlanta, GA (US); Xandr Inc., New York, NY (US)

( * ) Notice: Subject to any disclaimer, the term of this patent is extended or adjusted under 35 U.S.C. 154(b) by 71 days.

(21) Appl. No.: 16/776,795

(22) Filed: Jan. 30, 2020

(65) Prior Publication Data

US 2021/0241319 A1    Aug. 5, 2021

(51) Int. Cl.
*G06Q 30/02* (2012.01)
*G06F 16/955* (2019.01)
(Continued)

(52) U.S. Cl.
CPC ....... *G06Q 30/0269* (2013.01); *G06F 16/953* (2019.01); *G06F 16/954* (2019.01);
(Continued)

(58) Field of Classification Search
CPC .......... G06Q 30/0269; G06Q 30/0256; G06Q 30/0601; G06Q 30/08;
(Continued)

(56) References Cited

U.S. PATENT DOCUMENTS

2007/0260512 A1* 11/2007 Sattley ............... G06Q 30/0269
                                                         705/14.41
2010/0268603 A1* 10/2010 Nolet .................... G06Q 30/02
                                                         705/14.53
(Continued)

OTHER PUBLICATIONS

Becker et al., "Context transfer in search advertising," Proceedings of the 32nd international ACM SIGIR conference on Research and development in information retrieval (SIGIR 2009). Association for Computing Machinery, New York, NY, 2009. (Year: 2009).*

(Continued)

*Primary Examiner* — Christopher B Tokarczyk
(74) *Attorney, Agent, or Firm* — Guntin & Gust, PLC; Mark Wilinski

(57) ABSTRACT

Aspects of the subject disclosure may include, for example, receiving an indication of a selection of a first advertisement included within a first content item from a communication device, transmitting terms of purchase associated with the first advertisement responsive to the receiving of the indication of the selection of the first advertisement, selecting a second content item based on an indication of the first content item and/or a context associated with the communication device, transmitting the second content item to the communication device responsive to the selecting of the second content item, obtaining an indication of a transaction completed for a purchase from the communication device, selecting a second advertisement responsive to the indication of the transaction, and transmitting the second advertisement to the communication device. Other embodiments are disclosed.

20 Claims, 8 Drawing Sheets

(51) Int. Cl.
  *G06Q 30/06* (2012.01)
  *G06F 16/953* (2019.01)
  *G06F 16/954* (2019.01)
  *G06Q 30/08* (2012.01)
(52) U.S. Cl.
  CPC ....... *G06F 16/955* (2019.01); *G06Q 30/0256* (2013.01); *G06Q 30/0277* (2013.01); *G06Q 30/0601* (2013.01); *G06Q 30/08* (2013.01)
(58) Field of Classification Search
  CPC .... G06Q 30/0207–0277; G06F 16/954; G06F 16/955; G06F 16/953
  See application file for complete search history.

(56) References Cited

U.S. PATENT DOCUMENTS

| | | | | |
|---|---|---|---|---|
| 2010/0324993 | A1* | 12/2010 | Kacholia | G06Q 30/00 705/14.54 |
| 2012/0143701 | A1* | 6/2012 | Reis | G06Q 30/08 705/14.73 |
| 2014/0282217 | A1* | 9/2014 | Musa | G06F 3/0481 715/781 |
| 2015/0356570 | A1* | 12/2015 | Goldsmid | G06Q 30/0269 705/7.29 |

OTHER PUBLICATIONS

Ha, Anthony, "YouTube's Bumper Machine offers an automated way to create six-second ads", Techcrunch, https://techcrunch.com/2019/05/13/youtube-bumper-machine/2019/05/13/youtube-bumpe . . . Nov. 26, 2019, © 2013-2019 Verizon Media. All rights reserved. Powered by WordPress VIP. Fonts by TypeKit., May 13, 2019, 9 pgs.

Reeber, Brianne J., "Personalized advertising case study—Think with Google", https://www.thinkwithgoogle.com/advertising-channels/video/personalized-advertising-c . . . Nov. 26, 2019, Apr. 1, 2019, 3 pgs.

"Definition Of Practical", https://www.merriam-webster.com/dictionary/practical>, Accessed online Mar. 11, 2022, Mar. 11, 2022, 13 pgs.

"Definition Of Application", <https://www.merriam-webster.com/dictionary/application>, Accessed online Mar. 11, 2022, Mar. 11, 2022, 11 pgs.

Guttag, Eric, "The Broken Patent—Eligibility Test of Alice and Mayo: Why We Urgently Need to Return to Principles of Diehr and Chakrabarty", <https://www.ipwatchdog.com/2014/09/25/broken-patent-eligibility-test-of-alice-and-mayo/id=51370/>, Sep. 25, 2014, 8 pgs.

* cited by examiner

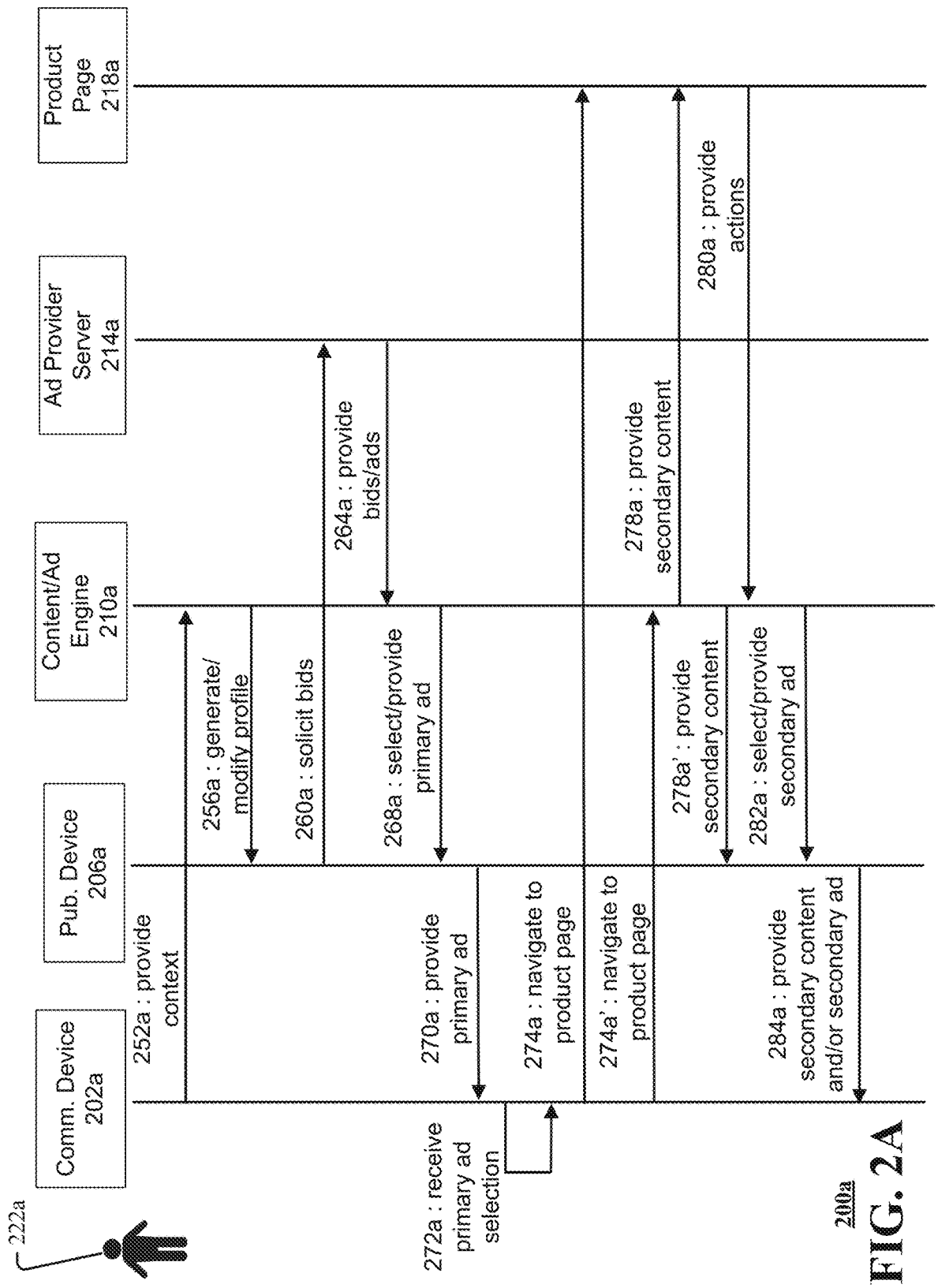

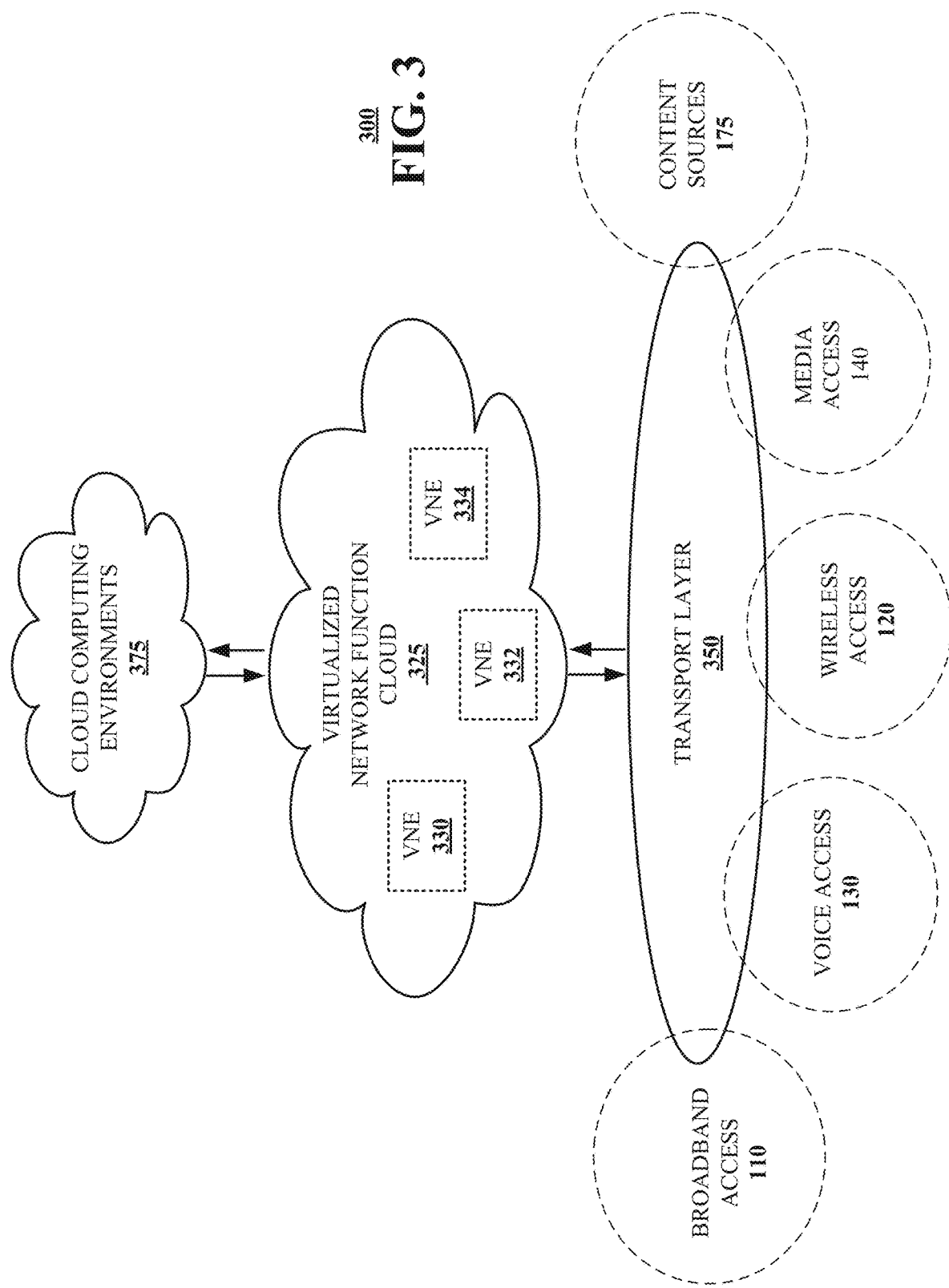

METHOD AND APPARATUS FOR GENERATING PERSONALIZED PAYLOADS

FIELD OF THE DISCLOSURE

Aspects of the disclosure are generally directed to methods and apparatuses for generating personalized payloads.

BACKGROUND

As the world becomes increasingly connected via communication devices and networks, additional opportunities are generated to promote content to users. For example, a sponsor of an advertisement that promotes a product or service may want the advertisement to be presented to the user in conjunction with, e.g., primary content of a publisher. When the user selects (e.g., clicks on) the advertisement, the user may be navigated away from the primary content to a site (e.g., a website) associated/affiliated with the advertisement. The user might not return to the primary content after navigating to the site associated with the advertisement. Thus, a publisher of the primary content may be deprived of potential additional revenue that may be generated from additional advertisements that may be presented in conjunction with the primary content. From the perspective of the user, the user's flow/progression through the primary content may be interrupted by the selection of the advertisement. Stated slightly differently, from the perspective of the user, (the selection of) the advertisement may represent a distraction (albeit, a tempting one).

BRIEF DESCRIPTION OF THE DRAWINGS

Reference will now be made to the accompanying drawings, which are not necessarily drawn to scale, and wherein:

FIG. 2A is a block diagram illustrating an example, non-limiting embodiment of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
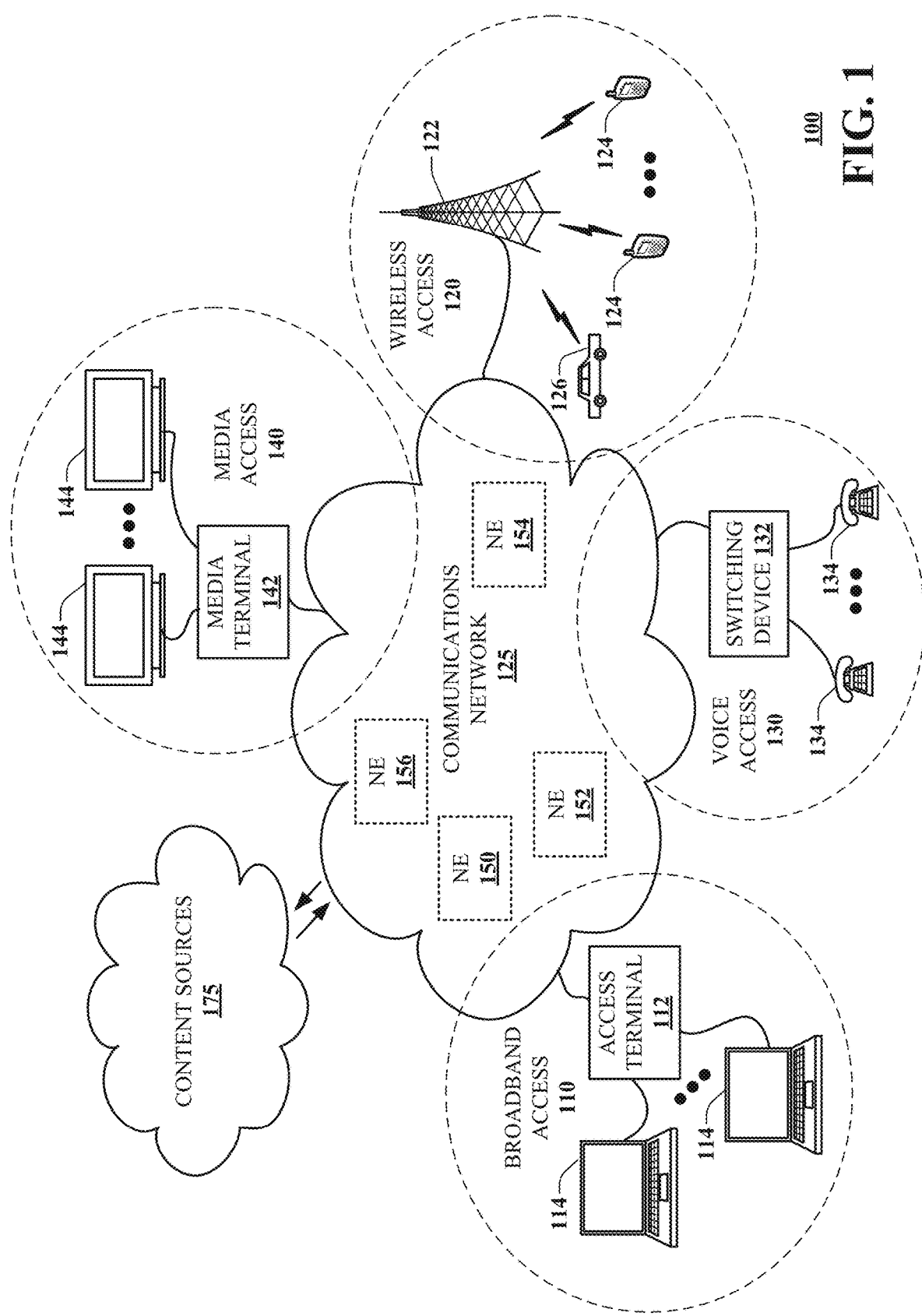
FIG. 1 is a block diagram illustrating an exemplary, non-limiting embodiment of a communication network in accordance with various aspects described herein.

The subject disclosure describes, among other things, illustrative embodiments for selecting and providing content items to communication devices. Other embodiments are described in the subject disclosure.

One or more aspects of the subject disclosure include providing a primary content item to a user device, obtaining a context associated with the primary content item, the user device, or a combination thereof, selecting a primary advertisement based on the context, providing the primary advertisement to the user device, obtaining an indication of a selection of the primary advertisement on the user device, providing a page associated with the primary advertisement responsive to the obtaining of the indication of the selection of the primary advertisement, providing a secondary content item to the user device responsive to the obtaining of the indication of the selection of the primary advertisement, detecting an action on the page, and providing a secondary advertisement to the user device responsive to the detecting of the action on the page.

One or more aspects of the subject disclosure include transmitting a request for a primary content item, responsive to the transmitting of the request, receiving the primary content item, transmitting a first context associated with a user of a processing system, a second context associated with the processing system, or a combination thereof, responsive to the transmitting of the first context, the second context, or the combination thereof, receiving a primary advertisement, responsive to the receiving of the primary advertisement, presenting the primary advertisement, transmitting an indication of a selection of the primary advertisement responsive to the presenting of the primary advertisement, obtaining a page associated with the primary advertisement responsive to the transmitting of the indication of the selection of the primary advertisement, presenting the page responsive to the obtaining of the page, transmitting an indication of at least one action taken on the page, and obtaining a second advertisement responsive to the transmitting of the indication of the at least one action.

One or more aspects of the subject disclosure include receiving an indication of a selection of a first advertisement included within a first content item from a communication device, transmitting terms of purchase for a product, a service, or a combination thereof, associated with the first advertisement responsive to the receiving of the indication of the selection of the first advertisement, selecting a second content item based on an indication of the first content item and a context associated with the communication device, transmitting the second content item to the communication device responsive to the selecting of the second content item, obtaining an indication of a transaction completed for a purchase of the product, the service, or the combination thereof, from the communication device subsequent to the transmitting of the second content item to the communication device, selecting a second advertisement responsive to the obtaining of the indication of the transaction, and transmitting the second advertisement to the communication device responsive to the selecting of the second advertisement.

Referring now to FIG. 1, a block diagram is shown illustrating an example, non-limiting embodiment of a communications network 100 in accordance with various aspects described herein. For example, communications network 100 can facilitate in whole or in part providing a primary content item to a user device, obtaining a context associated with the primary content item, the user device, or a combination thereof, selecting a primary advertisement based on the context, providing the primary advertisement to the user device, obtaining an indication of a selection of the primary advertisement on the user device, providing a page associated with the primary advertisement responsive to the obtaining of the indication of the selection of the primary advertisement, wherein the page is a webpage, providing a secondary content item to the user device responsive to the obtaining of the indication of the selection of the primary advertisement, detecting an action on the page, and providing a secondary advertisement to the user device responsive to the detecting of the action on the page. Communications network 100 can facilitate in whole or in part transmitting a request for a primary content item, responsive to the transmitting of the request, receiving the primary content item, transmitting a first context associated with a user of a processing system, a second context associated with the processing system, or a combination thereof, responsive to the transmitting of the first context, the second context, or the combination thereof, receiving a primary advertisement, responsive to the receiving of the primary advertisement, presenting the primary advertisement, transmitting an indication of a selection of the primary advertisement responsive to the presenting of the primary advertisement, obtaining a page associated with the primary advertisement responsive to the transmitting of the indication of the selection of the primary advertisement, presenting the page responsive to the obtaining of the page, transmitting an indication of at least one action taken on the page, and obtaining a second advertisement responsive to the transmitting of the indication of the at least one action. Communications network 100 can facilitate in whole or in part receiving an indication of a selection of a first advertisement included within a first content item from a communication device, transmitting terms of purchase for a product, a service, or a combination thereof, associated with the first advertisement responsive to the receiving of the indication of the selection of the first advertisement, selecting a second content item based on an indication of the first content item and a context associated with the communication device, transmitting the second content item to the communication device responsive to the selecting of the second content item, obtaining an indication of a transaction completed for a purchase of the product, the service, or the combination thereof, from the communication device subsequent to the transmitting of the second content item to the communication device, selecting a second advertisement responsive to the indication of the transaction, and transmitting the second advertisement to the communication device responsive to the selecting of the second advertisement.

As shown in FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200a functioning within, or operatively overlaid upon, the communication network 100 of FIG. 1 in accordance with various aspects described herein. As shown in FIG. 2A, the system 200a may include a communication device 202a, a publisher device 206a, a content/ad engine 210a, an advertising provider server 214a, and a product page 218a. In some embodiments, a user 222a may access the communication device 202a, potentially via one or more interfaces. In this regard, the communication device 202a may include a user/client device. Various methodological acts/operations/steps that may be undertaken/performed by the system 200a (or devices or components thereof) and/or facilitated by the system 200a are described in further detail below.

In step 252a the communication device 202a may provide a context to the engine 210a. The context of step 252a may include an identifier/identification (e.g., a uniform resource locator [URL], a link, etc.) of primary content or a primary content item that is presented by the communication device 202a. The primary content may include audio content, visual content, audiovisual content, or any combination thereof. The context of step 252a may include an identifier of the user 222a (e.g., a username, a personal identification number, etc.) and/or an identifier of the communication device 202a (e.g., a MAC address, a serial number, etc.). The context of step 252a may include an identifier of a social media profile associated with the user 222a. The context of step 252a may include an identifier of a location of the communication device 202a, which may be obtained based on one or more techniques (e.g., triangulation). The context of step 252a may include an identifier associated with one or more modes of communication or communication sessions engaged in by the user 222a and/or the communication device 202a, such as for example an email exchange/session, a voice call, a text or photo message exchange/session, etc. The context of step 252a may include an identifier associated with one or more programs or applications executed by the communication device 202a. The context of step 252a may include information associated with a browsing history of a browser executed/presented by the communication device 202a. For example, such information may include an identifier of one or more cookies, search terms entered into a search engine, etc.

In step 256a, the engine 210a may generate a profile that may be provided to the publisher device 206a. The profile of step 256a may be based at least in part on the context of step 252a. To the extent that the profile already exists, step 256a may include providing an update or modification to that existing profile. For example, the update/modification may be based on modifications or updates to the context of step 252a, where such modifications/updates to the context of step 252a may be based at least in part on one or more actions taken by the user 222a. In this respect, the system 200a may be referred to as a dynamic or adaptive system 200a, at least insofar as the system 200a may generate additional outputs in response to changing inputs or conditions.

While FIG. 2A illustrates a single user 222a, one skilled in the art will appreciate, based on a review of this disclosure, that the user 222a may be representative of a plurality or group of users in one or more embodiments. For example, the users 222a may be subscribers to a service associated with the system 200a. In this regard, step 256a may include a generation and/or modification of a unique profile associated with each of the users 222a. In some embodiments, the profile of step 256a may be at least partially based on the users 222a when taken in the aggregate. For example, the profile of step 256a may include a statistical profile, such as for example an average of characteristics or parameters included in the context of step 252a for the group of users 222a.

In step 260a, the publisher device 206a may identify at least a portion of the primary content that a publisher of the primary content is making available for acquisition (e.g., purchase). In one embodiment, one portion of digital content (hereafter inventory) may refer to a region of the screen or experience, a timed partition of a video, an image overlaid on a static or dynamic avatar (either virtual or human-based), etc. Other embodiments may realize the inventory as more immersive or embedded portions of content, such as a character, sign, or object in a (VR) virtual-, (AR) augmented-, or (XR) extended-reality experience. For example, the original primary content may include excerpts of a dialog that a non-player character in a VR game engages the primary user 222a with. As part of step 260a, the publisher device 206a may transmit a solicitation of bids for that portion of the primary content to the advertising provider server 214a. The solicitation of step 260a may include a specification of parameters of inventory within the primary content that is available for consumption. The solicitation of step 260a may include some or all of the profile(s) of step 256a in order to facilitate intelligent/informed bidding on the part of the advertising provider server 214a.

In response to obtaining the solicitation of step 260a, the advertising provider server 214a may provide/transmit advertisements to, e.g., the engine 210a in step 264a. The advertisements of step 264a may be accompanied by a bid, which may be representative of a price (or range of prices) that a sponsor of the advertisement is willing to pay for the inventory in the primary content. Techniques for generating bids are known to one of skill in the art, and so a description of how to arrive at such bids is omitted herein for the sake of brevity.

While FIG. 2A illustrates a single advertising provider server 214a, one skilled in the art will appreciate, based on a review of this disclosure, that the advertising provider server 214a may be representative of a plurality or group of advertising provider servers in one or more embodiments, each potentially associated with a different advertiser or sponsor. In this respect, as part of step 264a, each of the advertising provider servers 214a may provide/transmit an advertisement and bid to the engine 210a.

In step 268a, the engine 210a may select a particular, primary advertisement from the advertisements obtained as part of step 264a. The selection may be based at least in part on the bids accompanying the advertisements in step 264a. Other criteria may be used to select the primary advertisement. For example, the selection of step 268a may be based at least in part on a comparison or matching of characteristics of the primary advertisement relative to characteristics of a target demographic user base (where the characteristics of the target demographic user base may be included/embodied within the profile(s) of step 256a). The selection of step 268a may be based at least in part on an advertiser satisfying a particular expenditure or quota, potentially as a function of time. For example, the selection of step 268a may be based on a pacing goal being satisfied in terms of, e.g., a number of impressions served, click-through rates, or other metrics. As part of step 268a, the engine 210a may provide the primary advertisement to the publisher device 206a.

Responsive to obtaining/receiving the primary advertisement in step 268a, the publisher device 206a may, in turn, provide/transmit the primary advertisement to the communication device 202a in step 270a. As part of step 270a, the communication device 202a may incorporate the primary advertisement into the primary content.

In step 272a, the user 222a may undertake an action with respect to the primary advertisement. For example, the user 222a may affirmatively select the advertisement by, e.g., clicking on the advertisement, providing an oral command, or the like. In some embodiments, the selection of the primary advertisement may be inferred/implied on a passive basis, such as for example the user 222a dwelling on the primary advertisement as presented within the primary content for an amount of time that is greater than a threshold. In some embodiments, the selection of the primary advertisement may be determined based on the use of gaze technology, which may monitor or track eye motions/movements (or a lack thereof) of the user 222a. Other embodiments providing dwell time metrics may include the activities of user 222a and a mouse or pointer hover, a textual or verbal discussion dialog about the advertisement, a physical touch or "try on", or interaction of a virtual portion of the primary content.

Responsive to the selection of the primary advertisement in step 272a, the communication device 202a may navigate to the product page 218a in step 274a. The navigation of step 274a may include launching a tab or window (e.g., an additional tab or browser window) on the communication device 202a in order to present the product page 218a on the communication device 202a. The product page 218a may include a description or specification associated with a product or service affiliated with the primary advertisement, a review of the product/service by other users, etc. Other terms, such as pricing, availability, shipping, and the like, associated with the product or service may be presented as part of the product page 218a. An indication of the navigation to the product page 218a (or, analogously, an indication of the selection of the primary advertisement in step 272a) may be provided/transmitted to the engine 210a as shown in step 274a'.

Responsive to obtaining/receiving the indication of the navigation to the product page as part of step 274a', the engine 210a may provide (an identification/identifier of) secondary content to, e.g., the product page 218a (step 278a) and/or the publisher device 206a (step 278a'). As part of step 278a and/or step 278a', the engine 210a may select the secondary content based on an identification/identifier of the primary content (which may be included as part of the context of step 252a as described above), an identification/identifier of the primary advertisement, or a combination thereof. In some instances, the secondary content may be included/referenced within the primary content via one or more URLs, links, or the like, and the selection of the secondary content in step 278a/278a' may be based thereon.

As part of step 278a, the product page 218a (or, analogously, the communication device 202a) may include (e.g., present) the secondary content. The secondary content may be incorporated within the product page 218a as part of step 278a. For example, the secondary content may be presented as a link, a thumbnail, etc., as part of the product page 218a in step 278a.

In step 280a, one or more actions may be detected with respect to the product page 218a. For example, as part of step 280a a determination may be made that the product/service associated with the primary advertisement has been placed within a (virtual) shopping cart. Step 280a may include an identification of a transaction (e.g., a purchase) made with respect to the product/service. Other characteristics associated with an interest (or lack thereof) in the product/service may be identified as part of step 280a. An identification/identifier of the action(s) may be provided/transmitted to, e.g., the engine 210a as part of step 280a.

Responsive to obtaining/receiving the identification of the actions as part of step 280a, the engine 210a may select a secondary advertisement in step 282a. The selection of the secondary advertisement in step 282a may be based on the action(s) of step 280a. For example, if the action(s) of step 280a indicate that the user 222a purchased the product associated with the primary advertisement, the secondary advertisement of step 282a may correspond to a tool that may enhance the functionality or appearance of the purchased product. As part of step 282a, the engine 210a may provide/transmit the secondary advertisement to, e.g., the publisher device 206a.

While not explicitly shown in FIG. 2A, step 282a may include additional bidding activities similar to what is shown and described above in relation to steps 260a and 264a. For example, as part of step 282a, the engine 210a may solicit bids from the advertising provider server(s) 214a in accordance with the action(s) of step 280a. Such additional bidding activities may enable a fine-tuning in terms of the bids associated with the secondary advertisement, where those bids may be based at least in part on the action(s) of step 280a. Alternatively, or additionally, the selection of the secondary advertisement in step 282a may be based at least in part on the bids of step 264a.

Assuming that the user 222a has completed whatever activities/actions she desired to undertake in conjunction with the product page 218a, the completion of those activities may cause/trigger a presentation of the secondary content and/or the secondary advertisement in step 284a on the communication device 202a. For example, as part of step 284a, the publisher device 206a may provide/transmit the secondary content (of step 278a') and/or the secondary advertisement (of step 282a) to the communication device 202a for presentation on/by the communication device 202a. The completion of the activities may be explicit, such as for example a user selection of the (thumbnail or link associated with the) secondary content from the product page 218a, depression of a back button associated with a browser, etc. The completion of the activities may be implied/inferred, such as for example a lack of action undertaken on the product page 218a (by the user 222a) for a threshold amount of time.

While the various devices/entities 202a-218a are shown separately in FIG. 2A, one skilled in the art will appreciate that two or more of the entities may be combined within a common entity (e.g., a common housing) in some embodiments. In some embodiments, a given entity described above may be separated into more than one entity. Aspects of FIG. 2A may be implemented as part of one or more distributed computing systems or processing systems, peer-to-peer networks, client-server architectures, virtual machines, and the like. A given operation/step shown in FIG. 2A may be performed by an entity different from what is explicitly shown and/or may be targeted/directed/provided/transmitted to an entity that is different from what is explicitly shown.

Figure 2B:
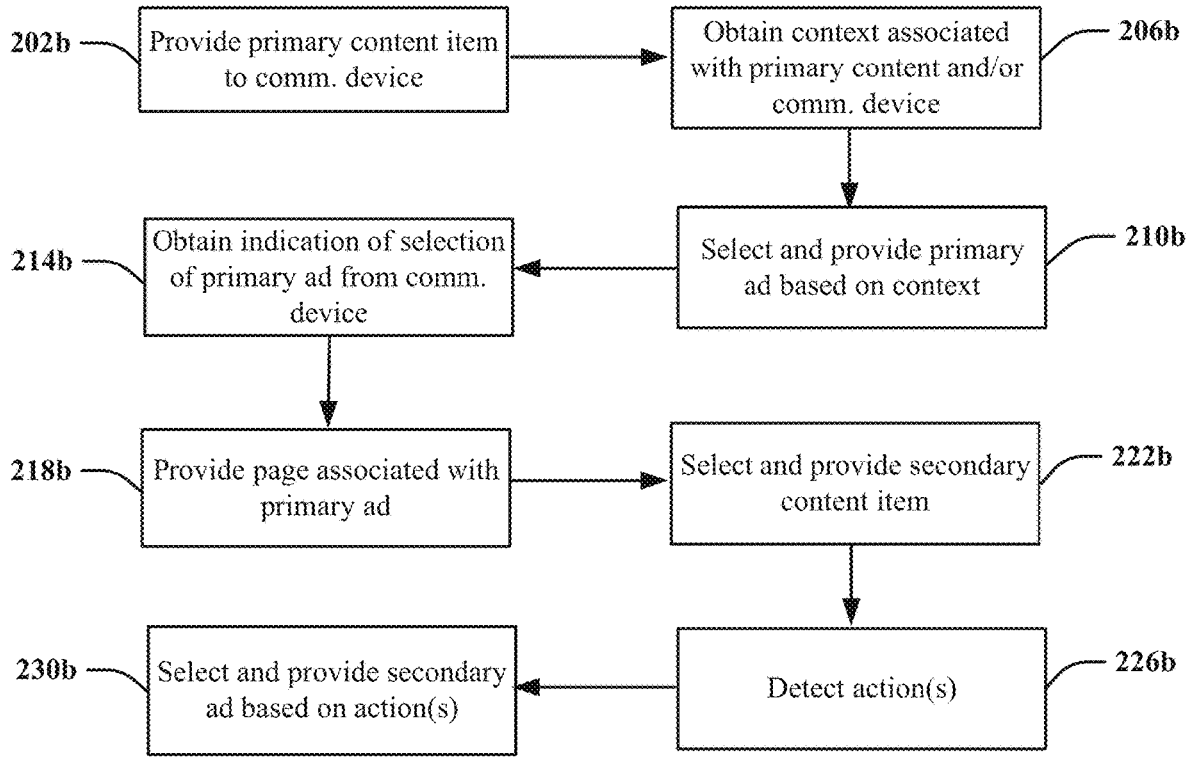
FIG. 2B depicts an illustrative embodiment of a method in accordance with various aspects described herein.

Referring now to FIG. 2B, an illustrative embodiment of a method 200b in accordance with various aspects described herein is shown. The method 200b may be partially or wholly executed in conjunction with one or more systems, devices, and/or components, such as for example the system 200a of FIG. 2A. The method 200b may be used to select and/or provide content items, such as articles, audio (e.g., music), video (movies, [television] programs), pictures (e.g., still-frame pictures), advertisements, etc., to one or more communication devices (e.g., one or more user/client devices).

In block 202b, a primary content item may be provided to a communication device. The primary content item may be selected by, e.g., a user in accordance with a search criteria entered by the user on the communication device. In some embodiments, the primary content item may be selected from a menu, a programming interface (e.g., an electronic programming guide, an interactive programming guide, etc.), or the like.

In block 206b, a context associated with the primary content item and/or the communication device may be obtained. For example, if the primary content item includes a movie, the context may include an identification of a spot in the movie that is currently being recorded or presented by the communication device. If the primary content item is a news article, the context may include a location within the news article that is currently within view of a viewport of a display device associated with (e.g., integrated within) the communication device. The context of block 206b may include one or more of the parameters described above in relation to step 252a of FIG. 2A.

In step 210b, a primary advertisement may be selected in accordance with the context of block 206b. For example, the primary advertisement may be selected in accordance with one or more purchasing (e.g., bidding) models or frameworks. The selected primary advertisement may be provided to the communication device. As part of step 210b, the communication device may record/save/store and/or present the primary advertisement, potentially in conjunction/combination with the primary content item of block 202b.

In block 214b, an indication of a selection of the primary advertisement may be obtained from, e.g., the communication device.

In block 218b, a page may be provided to the communication device. The page may be associated with a product and/or service associated with the primary advertisement. The page may provide an opportunity for the user to purchase, rent, or license the product and/or service. As part of block 218b, the communication device may record/save/store and/or present the page.

In block 222b, a secondary content item may be selected. The selection of the secondary content item in block 222b may be based on (an identification of) the primary content of block 202b, the context of block 206b, (an identification of) the primary advertisement of block 210b, the selection of the primary advertisement of block 214b, or any combination thereof. In some instances, the secondary content item may correspond to the primary content item. For example, the secondary content item may be a higher resolution (or lower resolution) version of the primary content item.

The selected secondary content item may be provided to, e.g., the communication device as part of block 222b. As part of block 222b, the communication device may record/save/store and/or present the secondary content item. For example, as part of block 222b, the communication device may present the secondary content item (or an indication thereof) within a portion of the page of block 218b.

In block 226b, one or more actions may be detected with respect to, e.g., the page of block 218b and/or the secondary content item of block 222b. For example, as part of block 226b, a log or receipt of a purchase or transaction with respect to the product/service represented in the page may be generated. Other types of actions (or lack of actions), such as for example an amount of time spent on a given portion of the page, may be identified and recorded as part of block 226b.

In block 230b, a secondary advertisement may be selected. The selection of the secondary advertisement may be based at least in part on one or more of the blocks of the method 200b set forth above, such as for example the detection of the action(s) in block 226b. The secondary advertisement may be provided to, e.g., the communication device as part of block 230b. As part of block 230b, the communication device may record/save/store and/or present the secondary advertisement, potentially in conjunction/combination with the primary content item of block 202b, the secondary content item of block 222b, or any combination thereof.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of the method 200b may be executed iteratively/repeatedly in order to update/modify any outputs that may be generated by the method 200b in response to dynamic/changing inputs or conditions. Various aspects of the method 200b may be implemented in accordance with one or more algorithms or models, such as for example machine learning models. In this respect, as the algorithms or models are exercised/utilized over time, the outputs produced via the method 200b may tend to become more accurate over time. Stated slightly differently, any error that may be present in the outputs may tend to converge to zero over time. As the outputs tend to become more accurate, such increased accuracy may tend to encourage/incentivize user adoption, which may tend to further increase the rate at which the error converges to zero (e.g., the rate of convergence may accelerate).

Figure 2C:
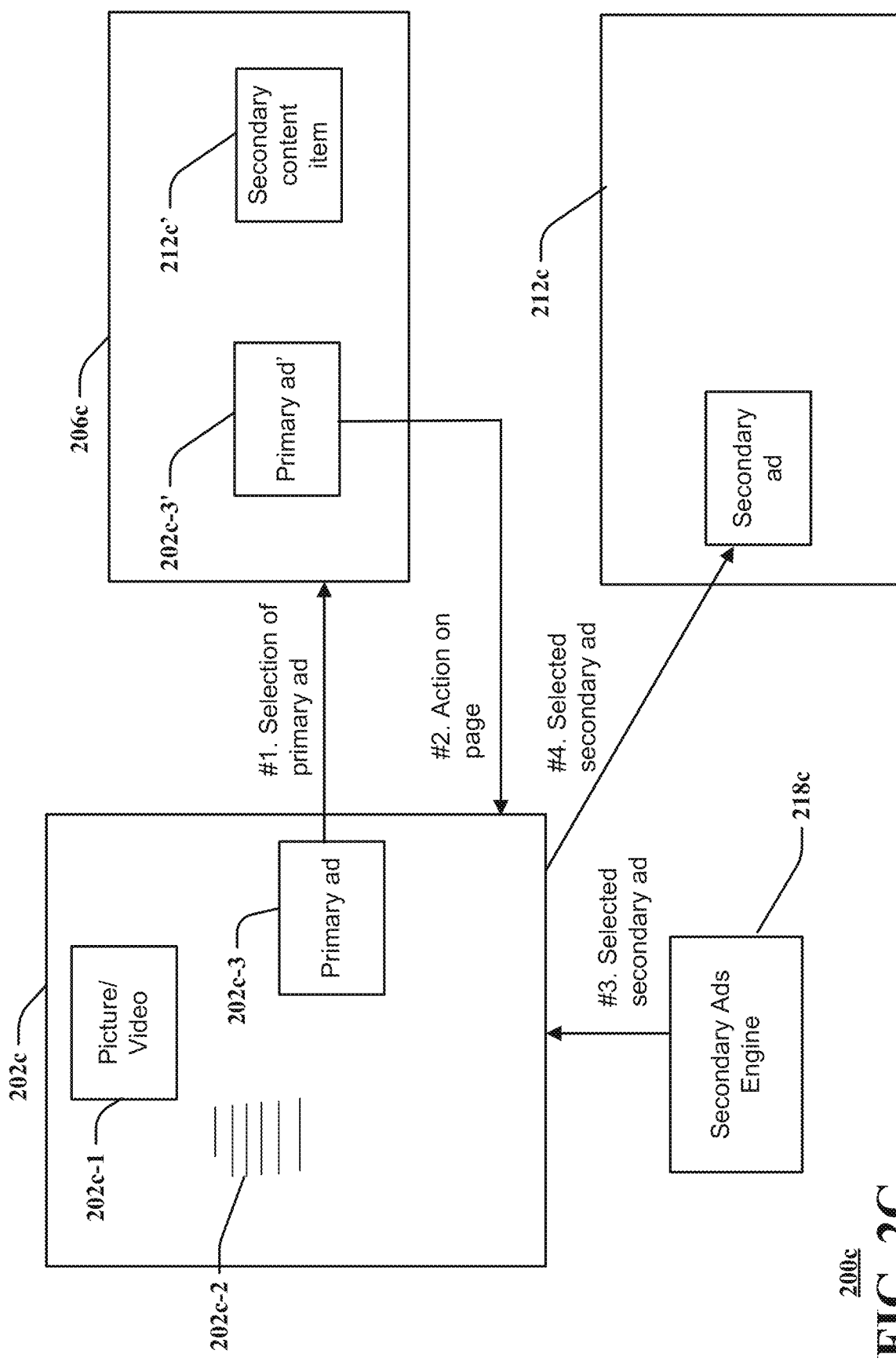
FIG. 2C depicts an illustrative embodiment of a diagram for selecting and providing content items and advertisements in accordance with various aspects described herein.

Referring now to FIG. 2C, a diagram 200c of an illustrative embodiment for selecting and presenting content is shown. A primary content item 202c corresponding to a news article is shown. The primary content item 202c may have been obtained and presented/rendered on/by a communication device using one or more techniques, such as for example a search technique facilitated via one or more search terms or keywords entered as part of a search query. As shown, the primary content item 202c may include one or more pictures or videos 202c-1, text 202c-2, and a primary advertisement 202c-3. The primary advertisement 202c-3 may have been selected for inclusion/incorporation as part of the primary content item 202c in accordance with the context of step 252a of FIG. 2A described above.

Responsive to a selection of the primary advertisement 202c-3 from the primary content item 202c (as represented via arrow #1 in FIG. 2C), a page 206c may be generated. The page 206c may include information (e.g., purchase terms, a specification, etc.) associated with a product/service affiliated with the primary advertisement 202c-3 (as represented by the primary ad 202c-3' in FIG. 2C) and a representation of a secondary content item 212c'. For example, the representation of the secondary content item 212c' may include a thumbnail image, a video trailer, a link, etc., associated with the secondary content item 212c.

Based on one or more monitored/detected actions present on the page 206c (as represented via the arrow #2 in FIG. 2C), the primary content item 202c (or a publisher device/server associated therewith) may request and obtain a secondary advertisement via, e.g., a secondary advertisement engine 218c as represented via the arrow #3 in FIG. 2C. The secondary advertisement may be selected based on one or more parameters or conditions, such as in accordance with an identification of the actions present on the page 206c.

The secondary advertisement may be provided to, e.g., the communication device as represented via the arrow #4 in FIG. 2C. The secondary advertisement may be included/incorporated as part of a presentation of the secondary content item 212c on/by the communication device.

As described herein, aspects of this disclosure provide/facilitate a linkage between a publisher of content items and potential or actual purchasers/buyers of inventory that may be included within the content items. For example, advertisers may bid on and/or purchase the inventory for purposes of populating the inventory with advertisements of products and/or services sponsored/promoted/produced/provided by the advertisers. The bids or purchase decisions may be influenced based on contextual information obtained from the publisher, where such contextual information may include parameters or characteristics associated with one or more users, devices, content items, or any combination thereof.

Aspects of the disclosure may facilitate a generation and/or selection of secondary content items based on actions taken by a user in respect of product or service purchases, leases, rentals, and the like. Various parameters regarding a user interest in a product or service may be obtained and analyzed as part of generating and/or selecting such secondary content items.

Aspects of the disclosure may selectively link or couple a given content item and an advertisement. In some embodiments, restrictions may be imposed and managed to avoid linking, e.g., an adult-natured advertisement with a child-oriented content item. Aspects of the disclosure may facilitate a determination of whether to link a given advertisement with a given content item on an administrative basis, on a per-advertising-campaign basis, in accordance with one or more user-generated inputs (e.g., one or more user preferences), etc.

Aspects of the disclosure may provide an easy mechanism for a user to return to a publisher's site following navigation away from the publisher's site. A user's recent browsing and advertisement viewing/clicking history on the publisher's site (or any other site) may be used to fine-tune a selection of advertisements and/or content items that are presented (e.g., displayed, played) to the user. Content items and/or advertisements may be presented via one or more applications, such as one or more browsers.

Aspects of the disclosure might not only be used to populate existing inventory in content items, but may also be used to identify additional areas/regions within content items where inventory should be allocated to advertisements. For example, aspects of the disclosure may identify additional and/or optimal locations within a content item to allocate inventory. A value may be assigned to those additional areas/regions/locations to facilitate bidding or purchasing decisions/processes.

Aspects of the disclosure may be used to couple insights obtained by an advertising provider and a publisher, with dynamically generated payloads incorporating advertisements and/or content items, to generate an optimal return/secondary content and return/secondary advertisement. In this manner, and from the perspective of the user, navigating to a page associated with a primary advertisement might not be perceived as being as much of a distraction/inconvenience as is present in conventional systems.

Aspects of the disclosure may encourage a return to a publisher's site (or a related site), which may generate additional revenue for the publisher or the publisher's affiliates. For example, the average time that a user spends on a publisher site is a metric that may be taken into consideration by an advertiser in terms of: (1) whether to bid on inventory made available by the publisher, and (2) how much to bid on that inventory. In this respect, aspects of this disclosure may facilitate intelligent and efficient bidding on inventory, thereby facilitating an improved use of scarce advertiser resources.

Aspects of the disclosure may enhance the relevance/applicability of content items or advertisements that are presented to a user. Such enhanced relevance may encourage additional user engagement, thereby increasing, e.g., revenue or profits for the publisher and/or the advertiser, while reducing (e.g., minimizing) an amount of time that a user spends locating products or services of interest to the user.

Aspects of the disclosure may facilitate an adaptation or formatting of a content item and/or an advertisement according to a context or one or more contextual parameters. For example, such formatting may be provided to take into account a capability associated with a communication device.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200a, and method 200b presented in FIGS. 1, 2A, and 2B. For example, virtualized communication network 300 can facilitate in whole or in part providing a primary content item to a user device, obtaining a context associated with the primary content item, the user device, or a combination thereof, selecting a primary advertisement based on the context, providing the primary advertisement to the user device, obtaining an indication of a selection of the primary advertisement on the user device, providing a page associated with the primary advertisement responsive to the obtaining of the indication of the selection of the primary advertisement, providing a secondary content item to the user device responsive to the obtaining of the indication of the selection of the primary advertisement, detecting an action on the page, and providing a secondary advertisement to the user device responsive to the detecting of the action on the page. Virtualized communication network 300 can facilitate in whole or in part transmitting a request for a primary content item, responsive to the transmitting of the request, receiving the primary content item, transmitting a first context associated with a user of a processing system, a second context associated with the processing system, or a combination thereof, responsive to the transmitting of the first context, the second context, or the combination thereof, receiving a primary advertisement, responsive to the receiving of the primary advertisement, presenting the primary advertisement, transmitting an indication of a selection of the primary advertisement responsive to the presenting of the primary advertisement, obtaining a page associated with the primary advertisement responsive to the transmitting of the indication of the selection of the primary advertisement, presenting the page responsive to the obtaining of the page, transmitting an indication of at least one action taken on the page, and obtaining a second advertisement responsive to the transmitting of the indication of the at least one action. Virtualized communication network 300 can facilitate in whole or in part receiving an indication of a selection of a first advertisement included within a first content item from a communication device, transmitting terms of purchase for a product, a service, or a combination thereof, associated with the first advertisement responsive to the receiving of the indication of the selection of the first advertisement, selecting a second content item based on an indication of the first content item and a context associated with the communication device, transmitting the second content item to the communication device responsive to the selecting of the second content item, obtaining an indication of a transaction completed for a purchase of the product, the service, or the combination thereof, from the communication device subsequent to the transmitting of the second content item to the communication device, selecting a second advertisement responsive to the indication of the transaction, and transmitting the second advertisement to the communication device responsive to the selecting of the second advertisement.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
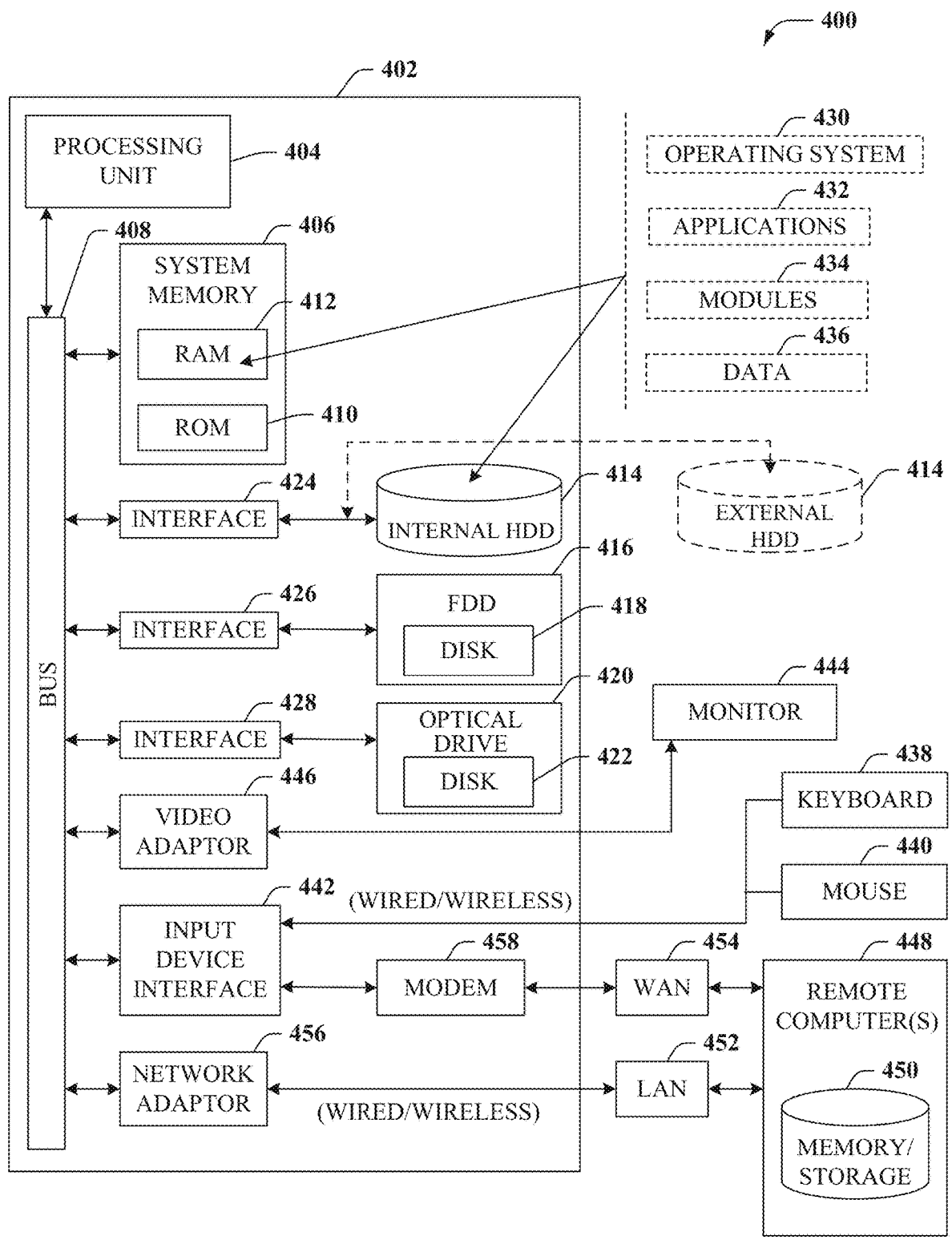
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part providing a primary content item to a user device, obtaining a context associated with the primary content item, the user device, or a combination thereof, selecting a primary advertisement based on the context, providing the primary advertisement to the user device, obtaining an indication of a selection of the primary advertisement on the user device, providing a page associated with the primary advertisement responsive to the obtaining of the indication of the selection of the primary advertisement, providing a secondary content item to the user device responsive to the obtaining of the indication of the selection of the primary advertisement, detecting an action on the page, and providing a secondary advertisement to the user device responsive to the detecting of the action on the page. Computing environment 400 can facilitate in whole or in part transmitting a request for a primary content item, responsive to the transmitting of the request, receiving the primary content item, transmitting a first context associated with a user of a processing system, a second context associated with the processing system, or a combination thereof, responsive to the transmitting of the first context, the second context, or the combination thereof, receiving a primary advertisement, responsive to the receiving of the primary advertisement, presenting the primary advertisement, transmitting an indication of a selection of the primary advertisement responsive to the presenting of the primary advertisement, obtaining a page associated with the primary advertisement responsive to the transmitting of the indication of the selection of the primary advertisement, presenting the page responsive to the obtaining of the page, transmitting an indication of at least one action taken on the page, and obtaining a second advertisement responsive to the transmitting of the indication of the at least one action. Computing environment 400 can facilitate in whole or in part receiving an indication of a selection of a first advertisement included within a first content item from a communication device, transmitting terms of purchase for a product, a service, or a combination thereof, associated with the first advertisement responsive to the receiving of the indication of the selection of the first advertisement, selecting a second content item based on an indication of the first content item and a context associated with the communication device, transmitting the second content item to the communication device responsive to the selecting of the second content item, obtaining an indication of a transaction completed for a purchase of the product, the service, or the combination thereof, from the communication device subsequent to the transmitting of the second content item to the communication device, selecting a second advertisement responsive to the indication of the transaction, and transmitting the second advertisement to the communication device responsive to the selecting of the second advertisement.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418)

and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
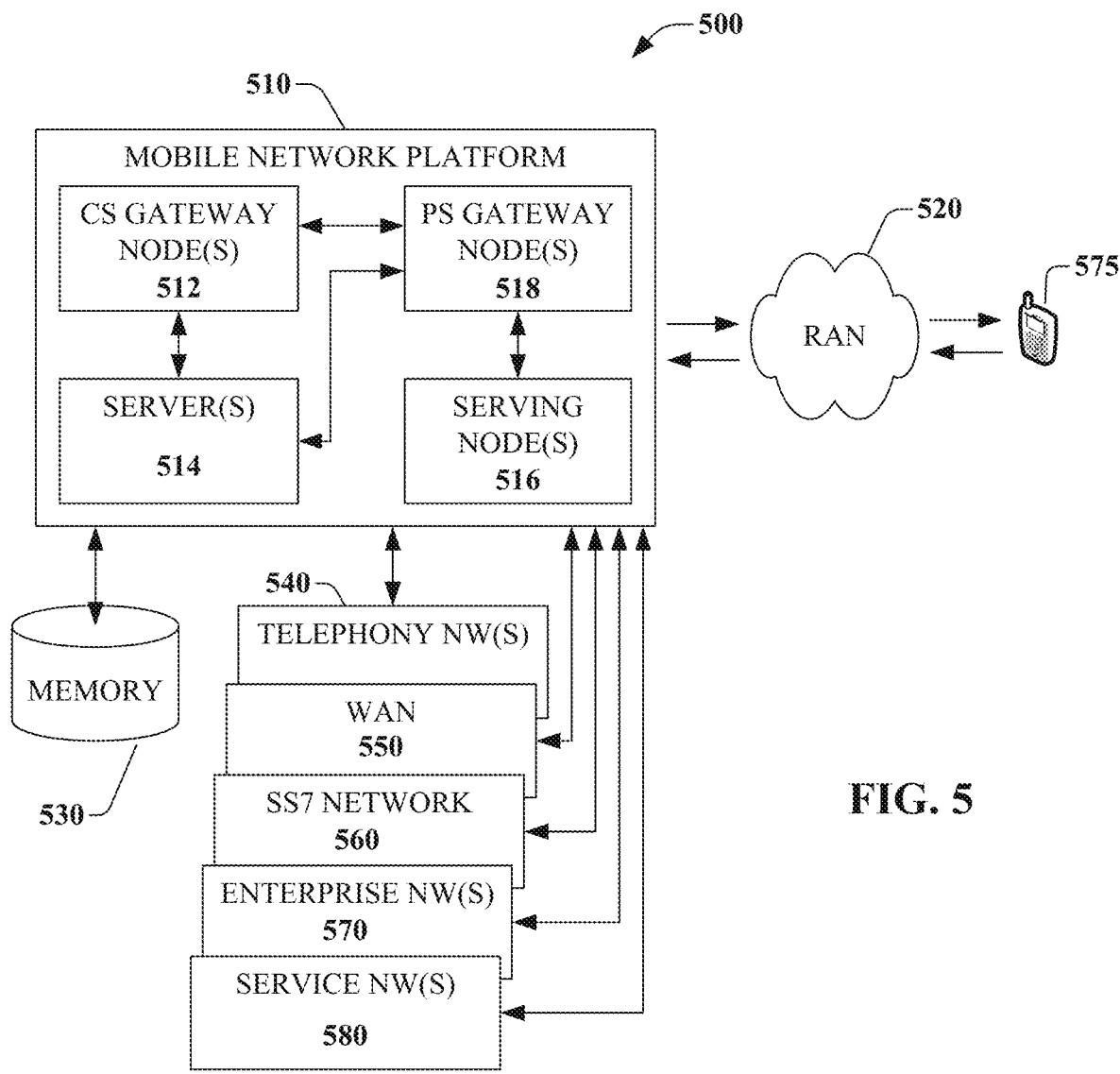
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part providing a primary content item to a user device, obtaining a context associated with the primary content item, the user device, or a combination thereof, selecting a primary advertisement based on the context, providing the primary advertisement to the user device, obtaining an indication of a selection of the primary advertisement on the user device, providing a page associated with the primary advertisement responsive to the obtaining of the indication of the selection of the primary advertisement, providing a secondary content item to the user device responsive to the obtaining of the indication of the selection of the primary advertisement, detecting an action on the page, and providing a secondary advertisement to the user device responsive to the detecting of the action on the page. Platform 510 can facilitate in whole or in part transmitting a request for a primary content item, responsive to the transmitting of the request, receiving the primary content item, transmitting a first context associated with a user of a processing system, a second context associated with the processing system, or a combination thereof, responsive to the transmitting of the first context, the second context, or the combination thereof, receiving a primary advertisement, responsive to the receiving of the primary advertisement, presenting the primary advertisement, transmitting an indication of a selection of the primary advertisement responsive to the presenting of the primary advertisement, obtaining a page associated with the primary advertisement responsive to the transmitting of the indication of the selection of the primary advertisement, presenting the page responsive to the obtaining of the page, transmitting an indication of at least one action taken on the page, and obtaining a second advertisement responsive to the transmitting of the indication of the at least one action. Platform 510 can facilitate in whole or in part receiving an indication of a selection of a first advertisement included within a first content item from a communication device, transmitting terms of purchase for a product, a service, or a combination thereof, associated with the first advertisement responsive to the receiving of the indication of the selection of the first advertisement, selecting a second content item based on an indication of the first content item and a context associated with the communication device, transmitting the second content item to the communication device responsive to the selecting of the second content item, obtaining an indication of a transaction completed for a purchase of the product, the service, or the combination thereof, from the communication device subsequent to the transmitting of the second content item to the communication device, selecting a second advertisement responsive to the indication of the transaction, and transmitting the second advertisement to the communication device responsive to the selecting of the second advertisement.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
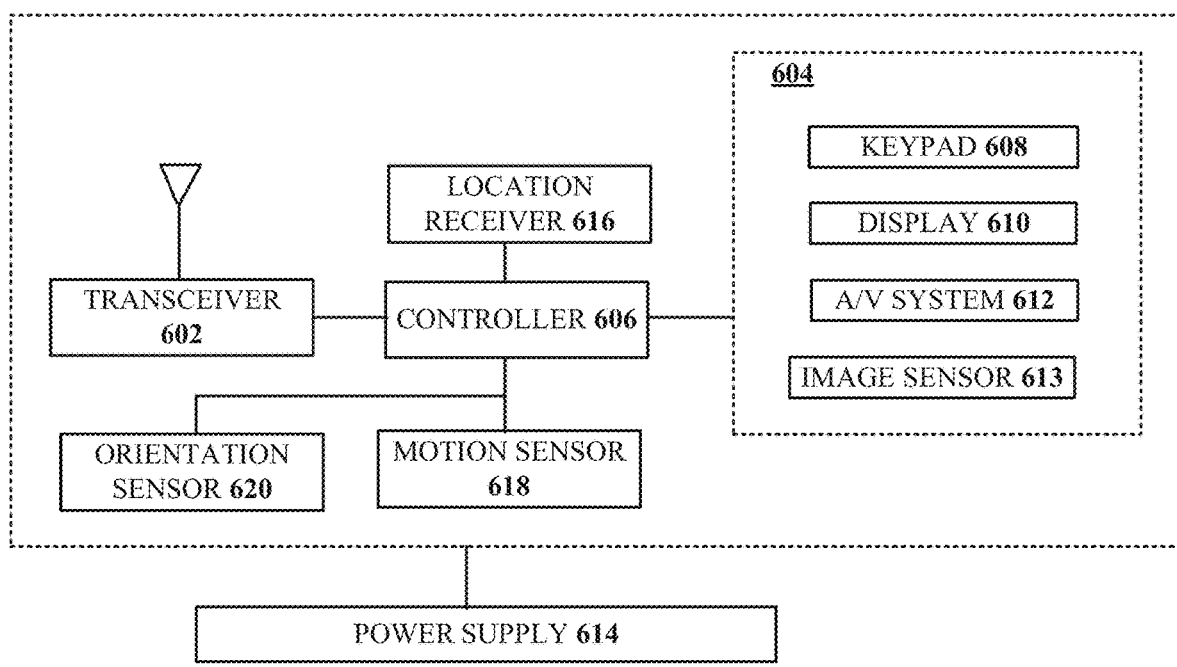
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part providing a primary content item to a user device, obtaining a context associated with the primary content item, the user device, or a combination thereof, selecting a primary advertisement based on the context, providing the primary advertisement to the user device, obtaining an indication of a selection of the primary advertisement on the user device, providing a page associated with the primary advertisement responsive to the obtaining of the indication of the selection of the primary advertisement, providing a secondary content item to the user device responsive to the obtaining of the indication of the selection of the primary advertisement, detecting an action on the page, and providing a secondary advertisement to the user device responsive to the detecting of the action on the page. Computing device 600 can facilitate in whole or in part transmitting a request for a primary content item, responsive to the transmitting of the request, receiving the primary content item, transmitting a first context associated with a user of a processing system, a second context associated with the processing system, or a combination thereof, responsive to the transmitting of the first context, the second context, or the combination thereof, receiving a primary advertisement, responsive to the receiving of the primary advertisement, presenting the primary advertisement, transmitting an indication of a selection of the primary advertisement responsive to the presenting of the primary advertisement, obtaining a page associated with the primary advertisement responsive to the transmitting of the indication of the selection of the primary advertisement, presenting the page responsive to the obtaining of the page, transmitting an indication of at least one action taken on the page, and obtaining a second advertisement responsive to the transmitting of the indication of the at least one action. Computing device 600 can facilitate in whole or in part receiving an indication of a selection of a first advertisement included within a first content item from a communication device, transmitting terms of purchase for a product, a service, or a combination thereof, associated with the first advertisement responsive to the receiving of the indication of the selection of the first advertisement, selecting a second content item based on an indication of the first content item and a context associated with the communication device, transmitting the second content item to the communication device responsive to the selecting of the second content item, obtaining an indication of a transaction completed for a purchase of the product, the service, or the combination thereof, from the communication device subsequent to the transmitting of the second content item to the communication device, selecting a second advertisement responsive to the indication of the transaction, and transmitting the second advertisement to the communication device responsive to the selecting of the second advertisement.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signalingstream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
providing a primary content item to a user device;
obtaining a context associated with the user device, wherein the context includes an identifier of a location of the user device and an identifier of a plurality of communication sessions engaged in by the user device, and wherein the plurality of communication sessions includes an email session, a voice call session, a text message session, and a photo message session;
selecting a primary advertisement based on the context;
formatting the primary advertisement according to the identifier of the location and the identifier of the plurality of communication sessions, resulting in a formatted primary advertisement;
providing the formatted primary advertisement to the user device;
obtaining an indication of a selection of the formatted primary advertisement on the user device;

providing a page associated with the primary advertisement responsive to the obtaining of the indication of the selection of the formatted primary advertisement, wherein the page is a webpage; and providing a secondary content item to the user device responsive to the obtaining of the indication of the selection of the formatted primary advertisement, wherein the primary content item is configured to be presented in a first browser window of the user device and the page is configured to be presented in a second browser window of the user device, the second browser window being different from the first browser window.

2. The device of claim 1, wherein the operations further comprise:

detecting an action on the page, wherein the detecting of the action on the page includes detecting a placement of a product or a service associated with the primary advertisement into a virtual shopping cart, a completed purchase transaction of the product or the service, or a combination thereof.

3. The device of claim 2, wherein the operations further comprise:

selecting a secondary advertisement in accordance with an identification of the action; and providing the secondary advertisement to the user device in accordance with the selecting of the secondary advertisement.

4. The device of claim 1, wherein the context includes an identifier of the primary content item, an identifier of a user of the user device, an identifier of the user device, an identifier of a social media profile associated with the user, an identifier of a location of the user device, an identifier associated with one or more modes of communication, an identifier of one or more communication sessions engaged in by the user or the user device, an identifier of one or more programs or applications executed by the user device, information associated with a browsing history of a browser executed by the user device, or any combination thereof.

5. The device of claim 1, wherein the primary content item includes an article, music, a movie, a still-frame picture, a television program, or any combination thereof.

6. The device of claim 1, wherein the operations further comprise:

obtaining a search query from the user device for the primary content item, wherein the providing of the primary content item to the user device is responsive to the obtaining of the search query.

7. The device of claim 1, wherein the operations further comprise:

obtaining an indication of a selection of the primary content item from a menu, an electronic programming guide, an interactive programming guide, or a combination thereof, wherein the providing of the primary content item to the user device is responsive to the obtaining of the indication of the selection of the primary content item.

8. The device of claim 1, wherein the operations further comprise:

providing at least a portion of the context to at least one server to solicit a bid from the at least one server for inventory located within the primary content item; and obtaining the bid from the at least one server responsive to the providing of the at least a portion of the context, wherein the selecting of the primary advertisement is based on the bid.

9. The device of claim 1, wherein the page is further configured to be presented in a tab of the first browser window.

10. The device of claim 1, wherein the providing of the formatted primary advertisement to the user device causes the user device to present the formatted primary advertisement within the primary content item.

11. The device of claim 1, wherein the providing of the secondary content item to the user device causes the user device to present the secondary content item within the page.

12. A non-transitory machine-readable medium, comprising executable instructions that, when executed by a processing system including a processor, facilitate performance of operations, the operations comprising:

transmitting a request for a primary content item;

responsive to the transmitting of the request, receiving the primary content item;

transmitting a context associated with the processing system, wherein the context includes an identifier of a location of the processing system and an identifier of a plurality of communication sessions engaged in by the processing system, and wherein the plurality of communication sessions includes an email session, a voice call session, a text message session, and a photo message session;

responsive to the transmitting of the context, receiving a primary advertisement that is formatted according to the identifier of the location and the identifier of the plurality of communication sessions;

responsive to the receiving of the primary advertisement, presenting the primary advertisement;

transmitting an indication of a selection of the primary advertisement responsive to the presenting of the primary advertisement;

obtaining a page associated with the primary advertisement responsive to the transmitting of the indication of the selection of the primary advertisement;

presenting the page responsive to the obtaining of the page;

transmitting an indication of at least one action taken on the page; and obtaining a second advertisement responsive to the transmitting of the indication of the at least one action, wherein the primary content item is configured to be presented in a first browser window and the page is configured to be presented in a second browser window, the second browser window being different from the first browser window.

13. The non-transitory machine-readable medium of claim 12, wherein the operations further comprise:

storing the second advertisement responsive to the obtaining of the second advertisement, presenting the second advertisement responsive to the obtaining of the second advertisement, or a combination thereof.

14. The non-transitory machine-readable medium of claim 12, wherein the operations further comprise:

obtaining a secondary content item responsive to the transmitting of the indication of the selection of the primary advertisement.

15. The non-transitory machine-readable medium of claim 14, wherein the primary content item and the secondary content item are each associated with a common publisher.

16. The non-transitory machine-readable medium of claim 14, wherein the secondary content item is a higher resolution version of the primary content item or a lower resolution version of the primary content item.

17. The non-transitory machine-readable medium of claim 14, wherein the page is a webpage, and wherein the presenting of the page includes presenting the secondary content item within the webpage via a link, as a thumbnail, or a combination thereof.

18. A method, comprising:

receiving, by a processing system including a processor, an indication of a selection of a first advertisement included within a first content item from a communication device, wherein the first advertisement is formatted according to a context associated with the communication device, the context including an identifier of a location of the communication device and an identifier of a plurality of communication sessions engaged in by the communication device, the plurality of communication sessions including an email session, a voice call session, a text message session, and a photo message session;

transmitting, by the processing system, a page including terms of purchase for a product, a service, or a combination thereof, associated with the first advertisement responsive to the receiving of the indication of the selection of the first advertisement;

selecting, by the processing system, a second content item based on an indication of the first content item and the context associated with the communication device;

transmitting, by the processing system, the second content item to the communication device responsive to the selecting of the second content item; and obtaining, by the processing system, an indication of a transaction completed for a purchase of the product, the service, or the combination thereof, from the communication device subsequent to the transmitting of the second content item to the communication device, wherein the first content item is configured to be presented in a first browser window of the communication device and the page is configured to be presented in a second browser window of the communication device, the second browser window being different from the first browser window.

19. The method of claim 18, further comprising:

selecting, by the processing system, a second advertisement responsive to the obtaining of the indication of the transaction;

formatting, by the processing system, the second advertisement in accordance with the context, resulting in a formatted second advertisement; and transmitting, by the processing system, the formatted second advertisement to the communication device.

20. The method of claim 18, further comprising:

selecting, by the processing system, a second advertisement responsive to the obtaining of the indication of the transaction; and transmitting, by the processing system, the second advertisement to the communication device in accordance with the selecting of the second advertisement, wherein the selecting of the second advertisement is based on an invocation of at least one machine learning model to identify the second advertisement.

\* \* \* \* \*